No. 761,830. Patented June 7, 1904.

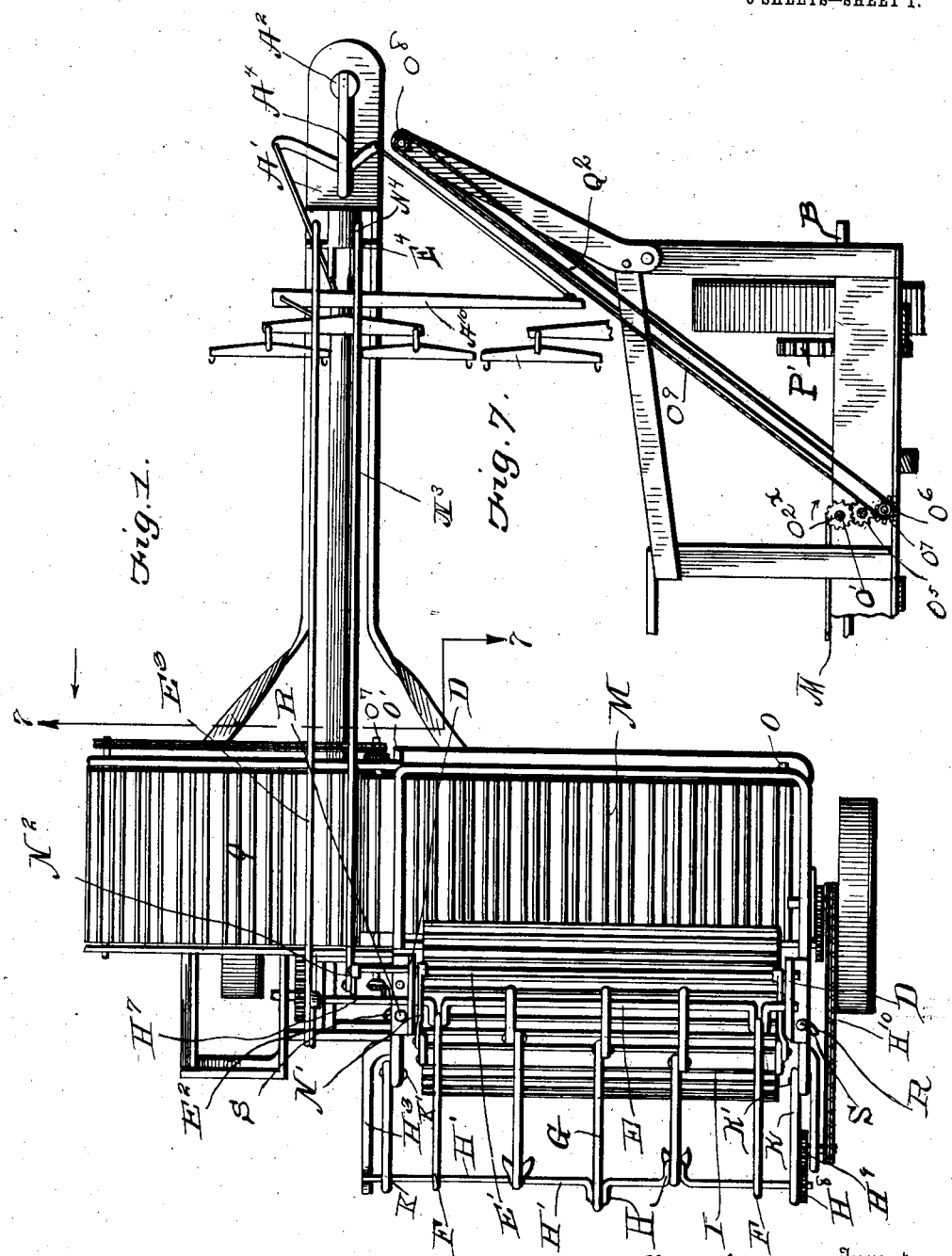

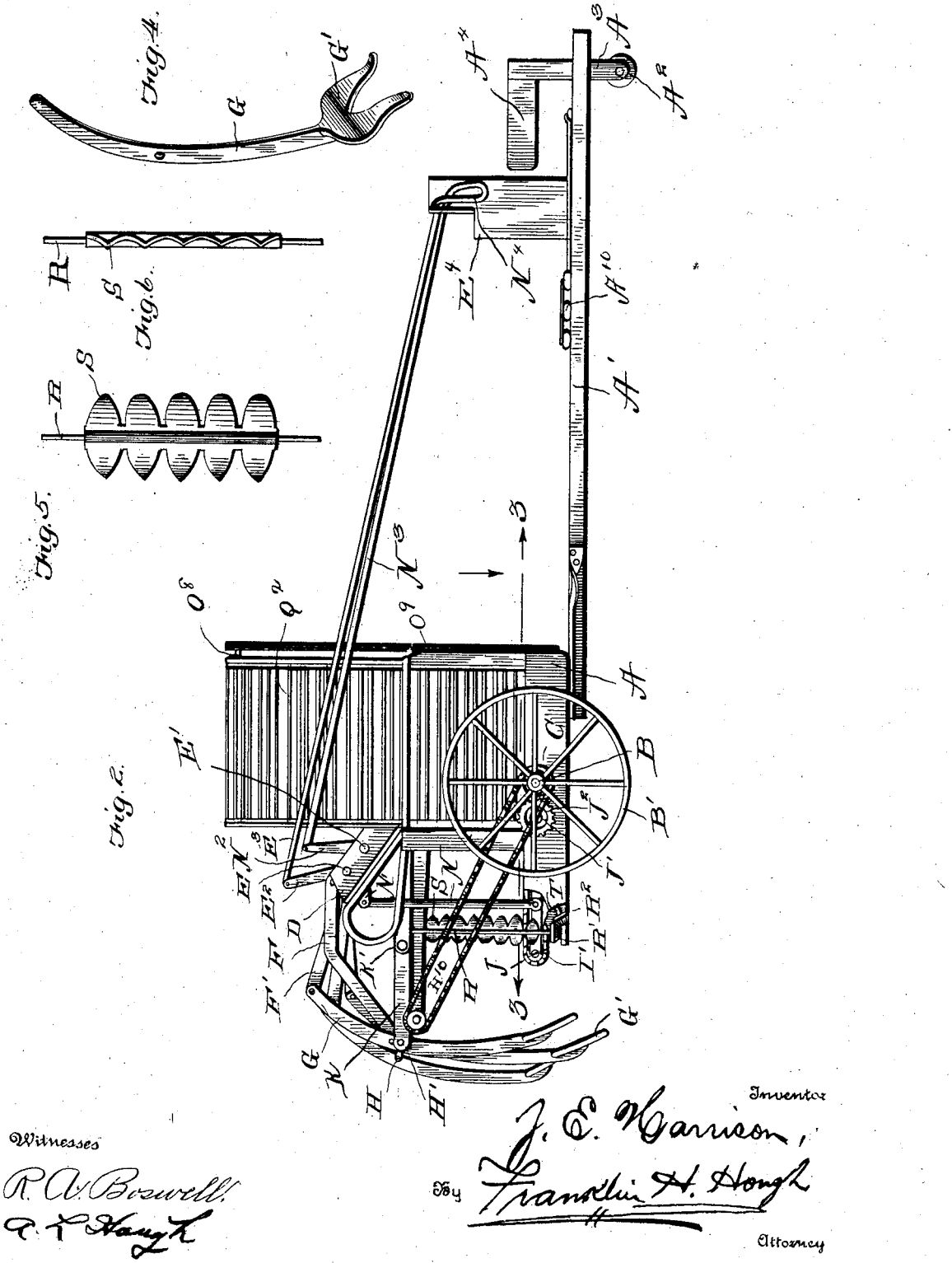

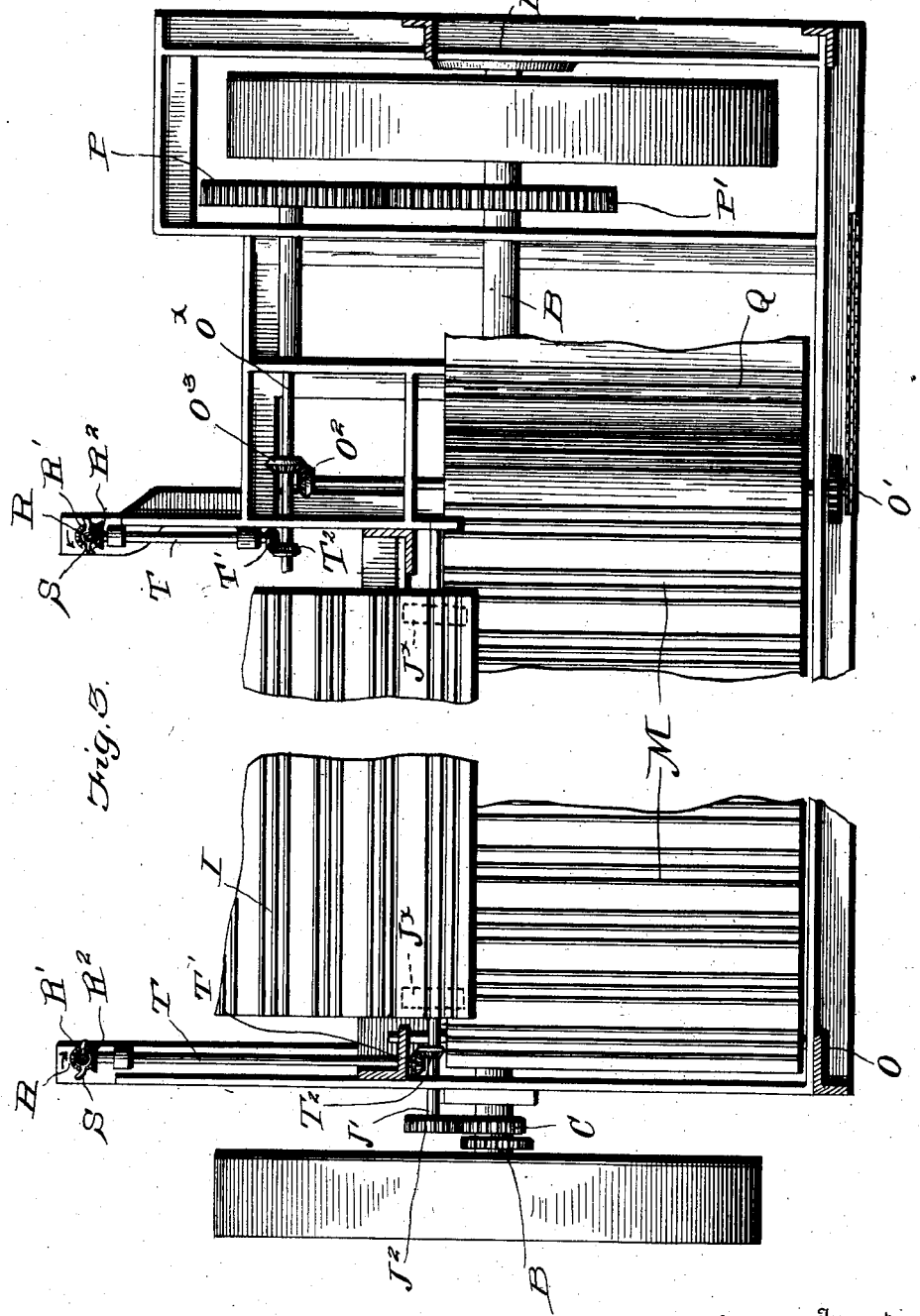

UNITED STATES PATENT OFFICE.

JESSE EDWARD HARRISON, OF WETASKIWIN, CANADA.

GRAIN OR HAY ELEVATOR.

SPECIFICATION forming part of Letters Patent No. 761,830, dated June 7, 1904.

Application filed May 19, 1903. Serial No. 157,865. (No model.)

*To all whom it may concern:*

Be it known that I, JESSE EDWARD HARRISON, a citizen of the United States, residing at Wetaskiwin, in the district of Alberta, Northwest Territories, and Dominion of Canada, have invented certain new and useful Improvements in Grain or Hay Elevators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in hay-elevating apparatus; and the object of the invention is to provide a machine for raising the grain from the ground and depositing the same upon a conveyer, whereby it may be carried and delivered to one side of the apparatus.

The invention consists, further, in various details of construction and combinations and arrangements of parts, which will be hereinafter fully described and then specifically defined in the appended claims.

My invention is illustrated in the accompanying drawings, in which—

Figure 1 is a top plan view of my improved grain and hay loader. Fig. 2 is a side elevation of the same. Fig. 3 is a horizontal sectional view on line 3 3 of Fig. 2 through the apparatus, parts being shown in top plan view. Fig. 4 is a detail perspective view of one of the forked members for raising the hay or grain. Fig. 5 is an enlarged detail view of one of the rotary beaters, and Fig. 6 is an edge view of the form shown in Fig. 5. Fig. 7 is a sectional view taken on line 7 7 of Fig. 1.

Reference now being had to the details of the drawings by letter, A designates the frame of a truck having a shaft B journaled in suitable bearings therein, and B' designates driving-wheels which rotate with said shaft, and C designates a pinion-wheel keyed to rotate with the shaft B. Journaled in the plates D, forming a part of the superstructure of the frame of the truck, are the shafts E and E', the former of which has pivotally connected to the crank thereon the angled links F, there being two of these links, one on either side of the apparatus, the other ends of which are connected to the shaft H'.

F' designates links which are loosely journaled upon the shaft E and their other ends pivotally connected to the arms G, each of said arms having pivotal connection with a crank H on a crank-shaft H', which latter is journaled in links K, there being one on each side of the frame, and each of said links K is pivoted at K' upon a portion of the frame of the apparatus. (Shown clearly in Fig. 2 of the drawings.) The end of each arm G has a fork G', a detail view of one of said forks being shown in Fig. 4 of the drawings. The several cranks H of the shaft H' are disposed at angles to each other which will cause the various forks to be successively brought into engagement with the material to be hoisted upon the loader as the shaft H' is rotated by gear-wheel $H^8$ thereon meshing with a pinion $H^9$, driven by a sprocket-wheel having chain connection $H^{10}$ with a sprocket-wheel on the main driving-shaft B. One end of said shaft E is bent to form a crank-arm $E^2$, and pivoted to said arm $E^2$ is a rod $E^3$, which extends rearward to the standard $E^4$, engages a slot in the latter, and has a portion bent to form a handle and adapted to engage behind said standard for the purpose of limiting the forward throw of said rod. Mounted upon the truck of said apparatus is an adjustable endless conveyer I, comprising an endless chain turning about the sprocket-wheels I', one of which is shown in Fig. 2 of the drawings. Said conveyer is mounted upon the suitably-journaled shafts J and J', the latter having fixed to one end thereof a pinion $J^2$, which is in mesh with the gear-wheel C. The rear end of the conveyer I is mounted to travel about sprocket-wheels $J^x$, rotating with the shaft J'. To the opposite sides of the endless conveyer I are pivotally connected the links N, one of which is shown in Fig. 2 of the drawnigs, the upper ends of said links N being pivotally connected to the crank-arms N', which are integral with the shaft E'. Said shaft E' also is provided with a crank-arm $N^2$, which is pivotally connected to a rod $N^3$, which has near its free end a portion $N^4$, bent to form a handle and adapted to engage behind said slotted standard E⁴. Said rod N³ is provided for the purpose of raising and lowering the outer end of the conveyer I, the handle ends of said rods E³ and N³ both being within convenient reach of the operator. Said standard E⁴ is mounted upon the tongue A′, having a suitable evener A¹⁰, the rear end of which is supported by means of a caster-wheel A², mounted on a yoke A³, the shank portion of which is journaled in an aperture near the end of the tongue, and a guiding-tiller A⁴ is secured near the upper end of said shank portion and is convenient to the platform on which the operator stands, whereby the apparatus may be guided. It is my purpose to attach to the tongue at any convenient location an evener to which the team may be connected along each side of the tongue A′, whereby the apparatus may be pushed in advance of the team.

A horizontally-disposed conveyer M is provided, which travels about sprocket-wheels mounted upon the shafts O and O′, which endless conveyer is driven by means of the bevel gear-wheel O², fixed to the shaft O′, which is in mesh with a bevel-gear O³, fixed to rotate with the shaft O×, journaled in the frame, said shaft O× carrying a pinion P, in mesh with a pinion P′ on the driving-shaft B. A pinion-wheel O⁵, journaled on the frame, meshes with pinion O²× and also with pinion O⁶ on the shaft O⁷, whereby power may be transmitted to the conveyers M and Q², and the conveyer Q² is disposed at an angle, as seen in Fig. 7, and passes about suitable sprocket-wheels driven by the sprocket-chain O⁹, traveling about the sprocket-wheels, one of which is mounted upon the shaft O⁷ and the other upon said shaft O⁸.

Mounted upon the vertically-disposed shafts R (there being two, one upon each side of the truck) are the beater members S, detail views of which are shown in Figs. 5 and 6 of the drawings, and having wings which are adapted to throw the grain or hay toward each other upon the adjustable conveyer between the same. The lower ends of said shafts R have bevel gear-wheels R′, which are in mesh with similar pinion-wheels R², fixed to rotate with the shafts T, the other ends of said shafts T, having bevel-pinions T′, which are in mesh with pinions T², which rotate with the shafts J′ and O×, respectively.

The operation of my apparatus is as follows: The team, being hitched to the evener upon the tongue, which extends rearward from the apparatus, is driven forward adjacent to the sheaves which have been shocked up, or along windrows if the elevator is used for hoisting hay, and the driving-wheels will cause the shafts carrying the same to impart a rotary movement to the crank-shaft H′, which will cause the forks to be actuated in such a manner as to cause the free ends thereof to pick up the grain or hay and throw it forward upon the conveyer I. As said conveyer is in geared connections with the other elevators, any grain or hay that may be deposited upon the same by the forks will be carried rearward and will fall upon the horizontally-disposed conveyer M and from the latter will be carried to and dropped upon the inclined elevator Q, which may be of any desired construction adapted to elevate the grain up the incline and drop the same over the end thereof into a wagon-box, which may be positioned adjacent to and along the side of the grain-elevator. By the provision of the rods with handle ends adjacent to the platform upon which the operator stands the shafts carrying the forked members may be raised and lowered, and also the conveyer I may be raised and lowered in order to adapt the apparatus to uneven ground and for the purpose of adjusting the forked members and the conveyer to work in connection with high or low shocks or windrows of hay, as the case may be, and by means of the caster-wheel and the tiller the operator may with his legs throw the same one way or the other to guide the apparatus in its forward movement.

While I have shown a particular construction of apparatus embodying my invention, it will be understood that I may make changes in the detailed construction of the elevating apparatus without departing from the spirit of the invention.

Having thus fully described my invention, what I claim as new, and desire to secure by Letters Patent, is—

1. A grain and hay loading apparatus comprising a truck having suitable driving mechanism, links pivotally connected to said truck, a crank-shaft journaled in said links, forked members pivotally mounted upon the cranks of said shaft, a second crank-shaft journaled in the frame of the truck, links pivotally connecting the cranks of said shafts, and link connections between the forked members and the shaft carried by the truck-frame, and means for operating said second shaft, as set forth.

2. An apparatus for elevating grain and hay, comprising a truck having suitable driving mechanism, links pivotally mounted upon the frame of the truck, a crank-shaft E journaled in said links, forked arms pivotally mounted upon said cranks, a second crank-shaft journaled in the frame of the truck, angled links pivotally connecting the cranks of said shafts, and links pivotally connected to the upper ends of said arms and their other ends having apertures through which said shaft E turns, and a crank-arm on the end of the shaft E, and rod connections with said arm, whereby the forked members may be raised and lowered, as set forth.

3. An apparatus for elevating grain and hay, comprising a truck with a suitable driving-shaft, endless conveyers, links pivotally mounted upon the frame of the truck, and crank-shafts journaled in said links, forked arms pivotally connected to the cranks of said shaft, a second crank-shaft journaled in the frame of the truck, pivotal link connections between the cranks of said shafts, links connecting said shaft carried by the truck with the upper ends of said arms, a rod having pivotal crank connections with the shaft carried by the frame of the truck, a tongue upon the truck, a standard mounted thereon, and a portion of said rod adapted to engage said standard, as set forth.

4. An apparatus for elevating grain and hay, comprising a truck having suitable driving mechanism, grain and hay elevating forks as described, means for raising and lowering the same, a vertically-adjustable endless conveyer, a crank-shaft journaled in the frame, link connections between said crank-shaft and conveyers, and a rod having pivotal connections with said links whereby the conveyer may be raised and lowered, as set forth.

In testimony whereof I hereunto affix my signature in presence of two witnesses.

JESSE EDWARD HARRISON.

Witnesses:
JOHN W. HARRISON,
NILS SCHMIDT.